United States Patent
Fukuda et al.

(10) Patent No.: US 6,751,800 B1
(45) Date of Patent: Jun. 15, 2004

(54) INFORMATION PROCESSING APPARATUS, METHOD, AND COMPUTER-READABLE MEDIUM

(75) Inventors: Kazuhiro Fukuda, Kanagawa (JP); Naohisa Kitazato, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/265,635

(22) Filed: Mar. 10, 1999

(30) Foreign Application Priority Data

Mar. 11, 1998 (JP) ........................................ P10-060027

(51) Int. Cl.[7] ............................................. H04N 5/445
(52) U.S. Cl. ...................................................... 725/40
(58) Field of Search ................... 725/32, 60, 135–136, 725/142; 348/634, 510, 423.1; 345/629, 717, 718

(56) References Cited

U.S. PATENT DOCUMENTS

| | | | | |
|---|---|---|---|---|
| 5,600,366 A | * | 2/1997 | Schulman ..................... | 725/36 |
| 5,923,627 A | * | 7/1999 | Miwa et al. ................... | 386/70 |
| 6,173,317 B1 | * | 1/2001 | Chaddha et al. ............ | 709/219 |
| 6,324,694 B1 | * | 11/2001 | Watts et al. ................... | 400/76 |

OTHER PUBLICATIONS

MHEG Seminar on Telecommunications Technology 97, Petteri Halme, Apr. 23, 1997, http://www.helsinki.fi/~phalme/mheg.html.*

Webopeida Online Computer dictionary: http://www.webopedia.com/TERM/V/VBR.html.*

* cited by examiner

Primary Examiner—Vivek Srivastava
Assistant Examiner—Hunter Lonsberry
(74) Attorney, Agent, or Firm—Lerner, David, Littenberg, Krumholz & Mentlik, LLP

(57) ABSTRACT

A system and method for creating multimedia information synchronized with a video signal (e.g., a program of a television broadcast) are provided. The multimedia information may be formatted in accordance with, for example, the MHEG standard or the ATVEF standard. The system includes means for specifying and verifying the contents of, and synchronizations for, the multimedia information. A scenario creation program creates a scenario composed of a plurality of scenes synchronized with playback of the video. A scene creation program combines objects consisting of text, images, audio, operation buttons and the like to create scenes (pages). A contents management program, a scenario management program and a scene management program set a directory of the contents, the scenarios and the scenes.

43 Claims, 14 Drawing Sheets

| SCENE | SENDING RATE (STACKING) |
|---|---|
| SCENE 1 | 2 |
| SCENE 2 | 1 |
| SCENE 3 | 1 |

INFORMATION PROCESSING APPARATUS, METHOD, AND COMPUTER-READABLE MEDIUM

FIELD OF THE INVENTION

The present invention relates to an information processing apparatus, method and computer-readable medium and, more particularly, to an information processing apparatus, method and computer-readable medium for creating, displaying and synchronizing audio, pictorial and textual data with video information.

BACKGROUND OF THE INVENTION

Standards exist, or have been proposed, for displaying information and data, including moving images, still images, sound and text in response to a user's interactive commands, and for synchronously displaying such information and data. One such standard, proposed by the International Organization for Standardization (ISO), is that defined by the Multimedia and Hypermedia Information Coding Experts Group (MHEG). Another standard is that defined by the Advanced Television Enhancement Forum (ATVEF), a consortium of broadcast and cable networks, consumer electronics companies, television transport operators and technology companies.

Information such as that corresponding to the MHEG standard or the ATVEF standard (hereinafter referred to generally as "multimedia information") can be provided to a viewer in a television broadcast. Other methods of transmission and display are contemplated, however, including over the Internet to computers.

Multimedia information generally changes little with respect to the video to which it corresponds. To provide multimedia information at an appropriate time, however, the multimedia information should be synchronized with the video to which it corresponds (for example, the moving images of a television broadcast). An authoring system or authoring tool for creating such synchronized multimedia information, however, does not exist. An object of the present invention is to provide such an authoring system or authoring tool.

SUMMARY OF THE INVENTION

The present invention provides an information processing system and method. The system includes means for specifying multimedia information and video with which the multimedia information is synchronized, means for creating the multimedia information and means for setting the timing for displaying scenes of the multimedia information to synchronize this information with the video. The method includes specifying multimedia information and video with which the multimedia information is to be synchronized, creating the multimedia information and setting timing for displaying scenes of the multimedia information to synchronize this information with the video. A computer-readable medium containing code for executing this method also is provided. In preferred embodiments, the multimedia information is either MHEG information or ATVEF information.

The specifying means preferably comprises a contents creating section for identifying the contents of the multimedia information and of the video with which the multimedia information is to be synchronized. The creating means preferably comprises a scene creating section for creating scenes of the multimedia information, and the setting means preferably comprises means for identifying the video's starting time for displaying scenes of the multimedia information synchronized with such starting time.

The information processing system preferably also comprises a display, and a display controller, for displaying a time axis of the video and symbols corresponding to a hierarchy of the scenes. The information processing system preferably also comprises means for setting a synchronization flag for activating or deactivating synchronized playback of the multimedia information with the video. A mid-processing playback flag for allowing or disallowing mid-processing display of an image also preferably is provided. Disallowing such mid-processing display prevents the image's display to a viewer who begins viewing the video at a point when the image's display would be meaningless.

The information processing system preferably also comprises managing means for organizing, in a hierarchical manner, the multimedia information into contents, scenarios and scenes and for managing this hierarchical structure. Means for setting the priority level of a scene, such that the rate at which the scene is transmitted from a broadcast station corresponds to a viewer's likelihood of selecting the scene for display, also preferably is provided.

The information processing apparatus preferably also comprises means for setting a display mode flag for determining whether a viewer can control the multimedia information's display. The setting of this flag prevents the viewer from switching off this display.

DESCRIPTION OF THE PREFERRED EMBODIMENTS

Figure 1:
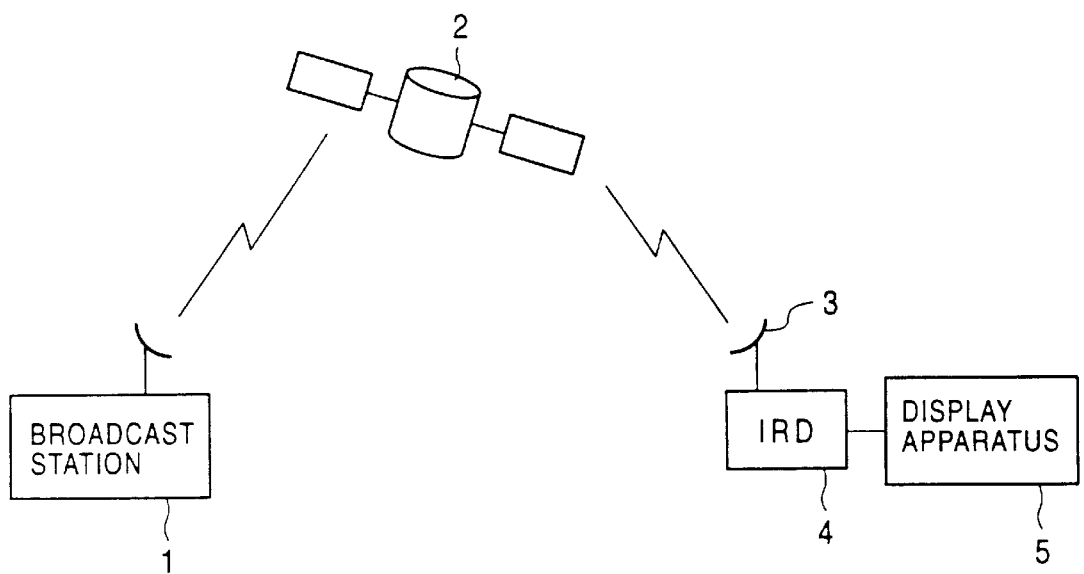
FIG. 1 is a block diagram of a system for broadcasting multimedia information created using the apparatus and method of the present invention.

A broadcasting system for broadcasting video and multimedia information, such as, e.g., MHEG information or ATVEF information, is shown in FIG. 1. Broadcast station 1 transmits television broadcasting signals containing multiplexed multimedia information signals. Antenna 3 receives these signals via satellite 2. The received signals are supplied to IRD (Integrated Receiver and Decoder) 4 which extracts the television and multimedia signals on a predetermined channel. The extracted signals are supplied to display apparatus 5 for displaying the multimedia information superposed upon the video of a television broadcast.

Figure 2:
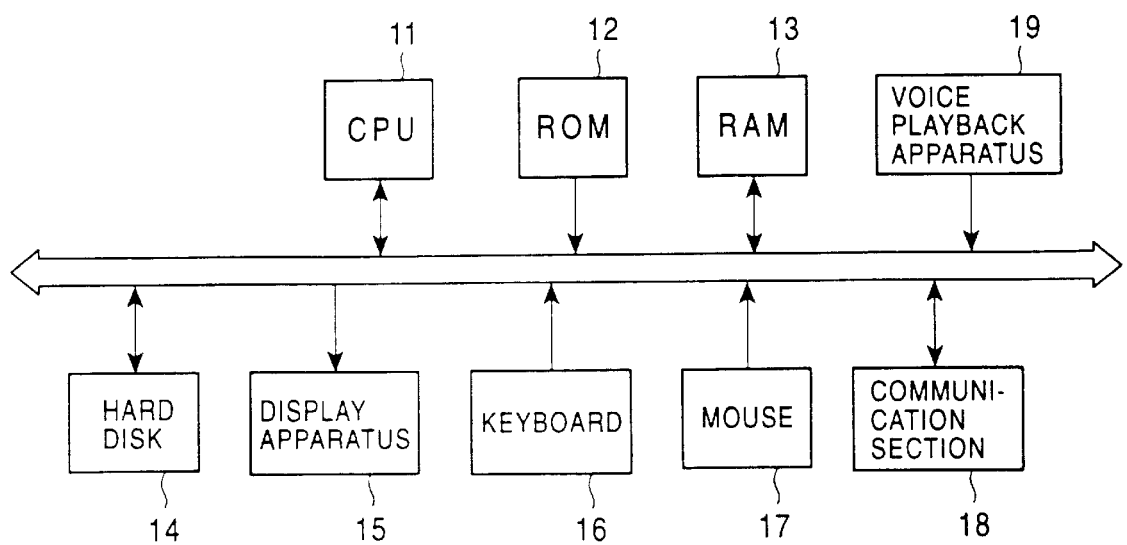
FIG. 2 is a block diagram of an apparatus for creating multimedia information in accordance with the present invention.

FIG. 2 is a block diagram of an apparatus in accordance with the present invention for creating multimedia information for transmission by broadcast station 1. The apparatus of FIG. 2 can be used to create any form of multimedia information, for example, MHEG information or ATVEF information. For the purpose of this example, however, it will be assumed that the apparatus of FIG. 2 is used to create MHEG information.

The apparatus of FIG. 2 includes CPU 11 for providing overall control in accordance with a program stored in ROM 12 and RAM 13. CPU 11 may be, e.g., a microprocessor or similar device. CPU 11 also executes a multimedia authoring program stored on, e.g., hard disk 14 for creating MHEG information. The authoring program can, of course, be stored on any computer-readable medium accessible to CPU 11, e.g., a floppy disk, magnetic tape, optical disk, etc.

Display apparatus 15 displays the MHEG information, and the video to be synchronized with the MHEG information, to an operator. Keyboard 16 and mouse 17 enable the operator to control the apparatus' operations. A communication section 18 including, for example, a modem, controls communications over a telephone line, the Internet, or the like. Sound playback apparatus 19 plays back sound to be synchronized with the video or MHEG information.

Figure 3:
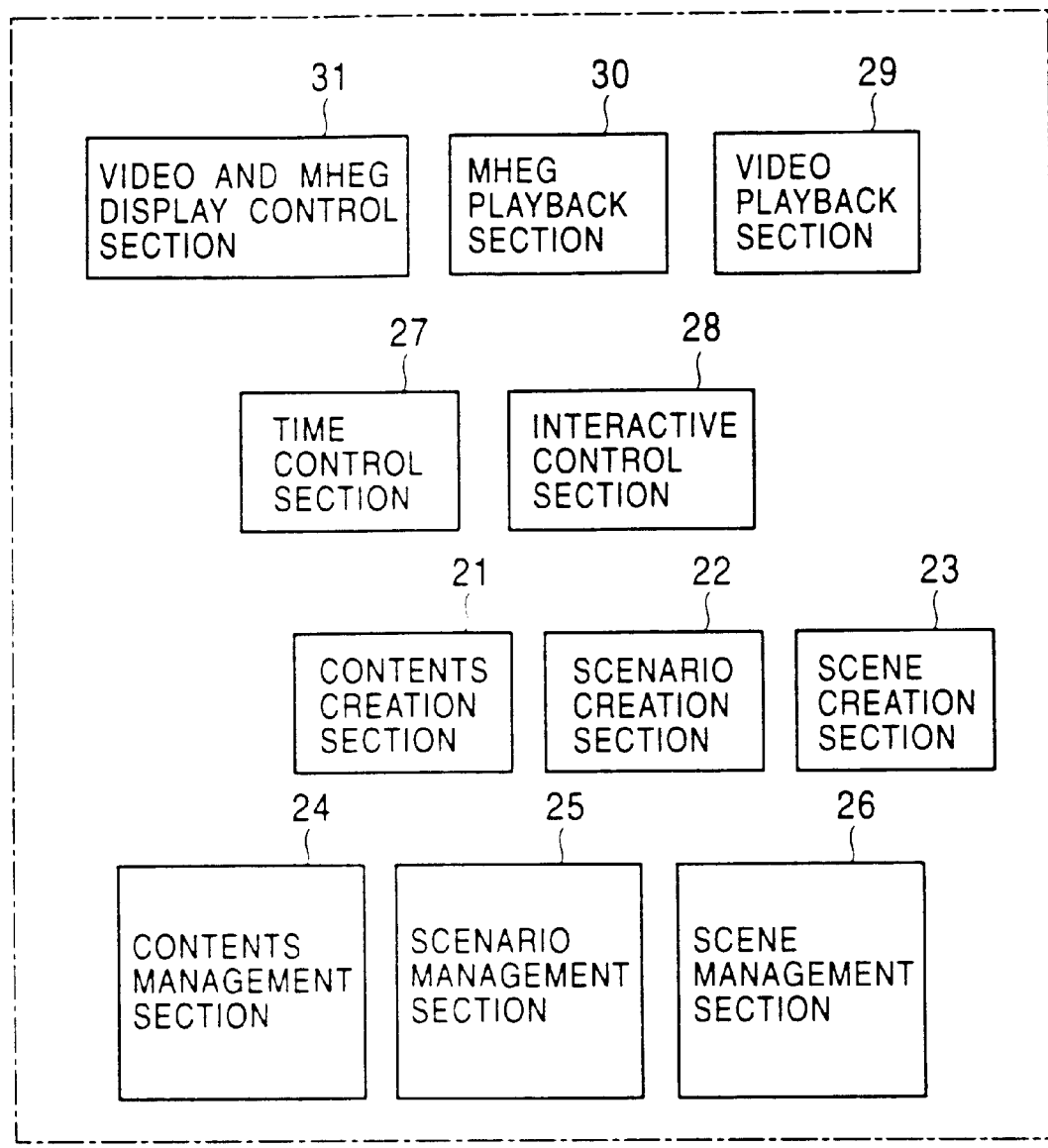
FIG. 3 is a block diagram of the sections of a computer program executed by the multimedia creating apparatus of FIG. 2.

FIG. 3 shows the functional blocks (sections) of the multimedia information authoring program executed by CPU 11. As indicated above, in this example, it is assumed that the authoring program is for authoring MHEG information. Although each of these blocks receives information from one or more of the other blocks and provides information to one or more of the other blocks, for clarity of presentation, arrows among the blocks indicating such inputs and outputs are omitted.

A contents creation section 21 creates contents information for the MHEG information. This contents information corresponds to a video (e.g., a program of a television broadcast) to be synchronized with the MHEG information. The contents information is provided to the contents management section 24.

The contents information corresponds to a group of scenarios and comprises eight items of information:

(1) contents_name
(2) service_name
(3) program_name
(4) es_number
(5) start_time
(6) duration
(7) additional_info
(8) application_number In the contents_name, "contents_1988_4_1_1," for example, is recorded to identify the name of the contents. In the service_name, "NHK," for example, is recorded to identify the channel on which the program including the multimedia information is broadcast. In the program_name, "baseball," for example, is recorded to identify the program's name. In the es_number, "10," for example, is recorded to identify the number of elementary streams. In the start_time, "+00/00/00," for example, is recorded to identify the relative time for starting the display of the MHEG information with respect to the video with which the MHEG information is synchronized. In the duration, "00/00/00," for example, is recorded to indicate the duration of the multimedia information's display from the relative start time. In the additional_info, "scenario 1," for example, is recorded to indicate that the information corresponds to the first scenario. In the application number, "3," for example, is recorded to indicate the number of scenarios contained in the contents.

The contents creation section 21 also manages an application information file for recording the start time and duration for broadcasting a scene (described later with reference to FIG. 9).

The scenario creation section 22 creates a scenario, and scenario information, and provides its output to the scenario management section 25. A scenario is composed of a plurality of scenes synchronized with the video. The scenario information comprises four items of information:

(1) es_name
(2) data_type
(3) customized_info
(4) scene_number

In the es_number, "DATA 1," for example, is recorded to identify the name of the elementary stream corresponding to the scenario. In the data_type, "mheg," for example, is recorded to identify the type of multimedia information. In the customized_info, any specific information corresponding to the scenario may be recorded. In the scene_number, "3," for example, is recorded to indicate the number of scenes in the scenario.

Figure 4:
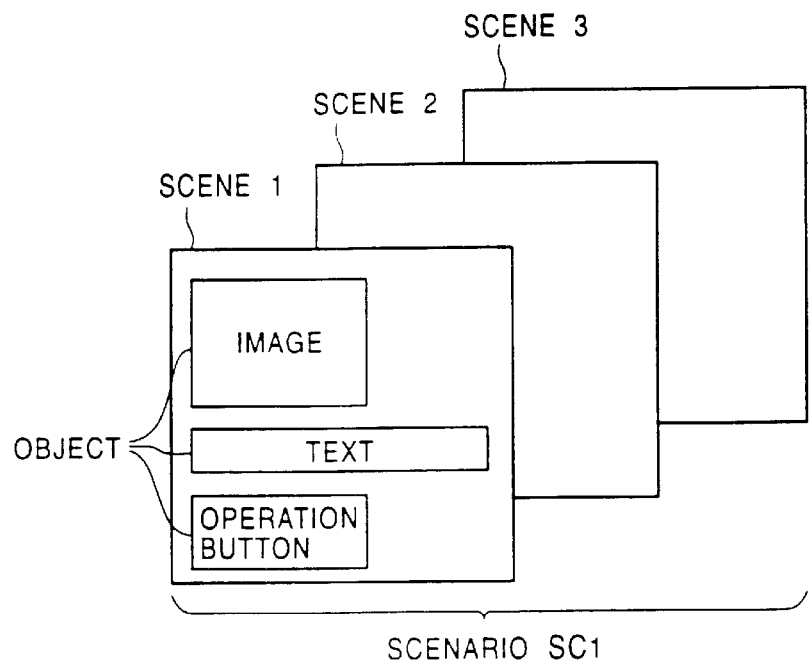
FIG. 4 is an illustration of the objects of a scene.

The scene creation section 23 combines "objects." As shown in FIG. 4, the objects make up a scene (page) and may be textual information, image information, audio information, operational buttons, and the like. The output of scene creation section 23 is provided to scene management section 26.

A scene can be switched on and off either by synchronization signals contained in the video signal or through a viewer's interactive operations, for example, activating operational buttons displayed in the scene. Further, it is possible to set, in the operational buttons, functions for executing predetermined processing, for example, to provide textual information to be displayed for applying for the purchase of a product.

A scene is composed of scene data and six items of information corresponding to these data:

(1) scene_priority_level
(2) file_name
(3) stream_event_name
(4) stream_event_time
(5) stream_name
(6) es_name In the scene_priority_level, "1," for example, is recorded to identify the sending rate (described later) for the scene. In the file_name, "bitmap.jpg," for example, is recorded to identify the name of an object. In the stream_event_name, "stream event 1," for example, is recorded to identify the name of the stream event. In the stream_event_time, "00/00/00," for example, is recorded to identify the starting time for sending the scene. In the stream_name, "stream link 1," for example, is recorded to identify the name of the stream. In the es name, "DATA 1", for example, is recorded to identify the name of the elementary stream of a link destination.

The scene creation section 23 also manages scene information and records within this information synchronization flags (described below with reference to FIG. 13), mid-processing playback mode flags (described below with reference to FIG. 14) and display mode flags (described below).

Figure 5:
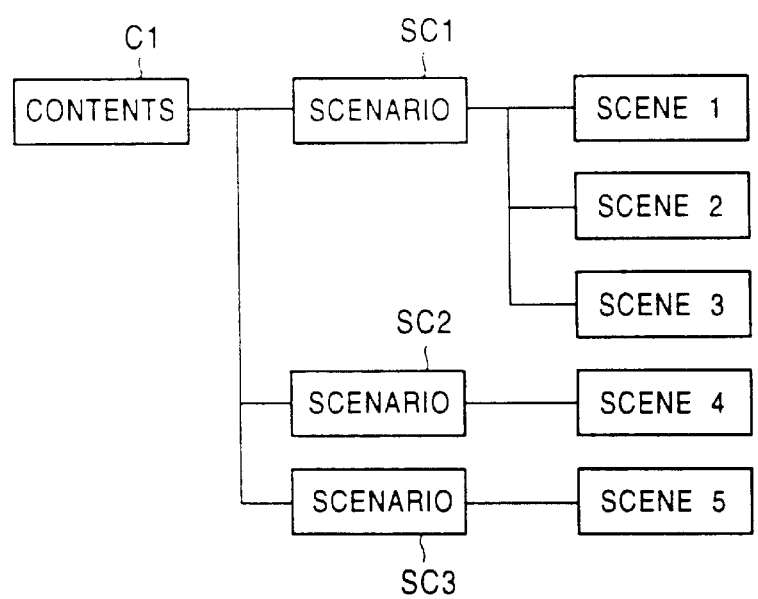
FIG. 5 is an illustration of a directory for the multimedia information showing the information's hierarchical structure.

The contents management section 24, the scenario management section 25 and the scene management section 26 set the directory for the contents, the scenarios and the scenes. An example is shown in FIG. 5. In this example, a contents C1 is set in the highest-order directory, and scenarios SC1, SC2 and SC3 are set in the next highest-order directory. In the scenario SC1, three scenes, scene 1, scene 2 and scene 3, are set. In the scenarios SC2 and SC3, scene 4 and scene 5, respectively, are set.

Referring again to FIG. 3, a time control section 27 reads time information for the video to be played back by video playback section 29 and outputs this information to a video and MHEG display control section 31. An interactive control section 28 records settings for switching the display of the scenes in response to operations of the user.

The video playback section 29 plays back the video with which the MHEG information is to be synchronized. The MHEG playback section 30 plays back the MHEG information to verify that the creation, synchronizations, etc. are correct. The video and MHEG display control section 31 controls the display apparatus 15 (FIG. 2) so that the MHEG information played back by the MHEG playback section 30 is displayed superposed over the video information played back by the video playback section 29.

Figure 6:
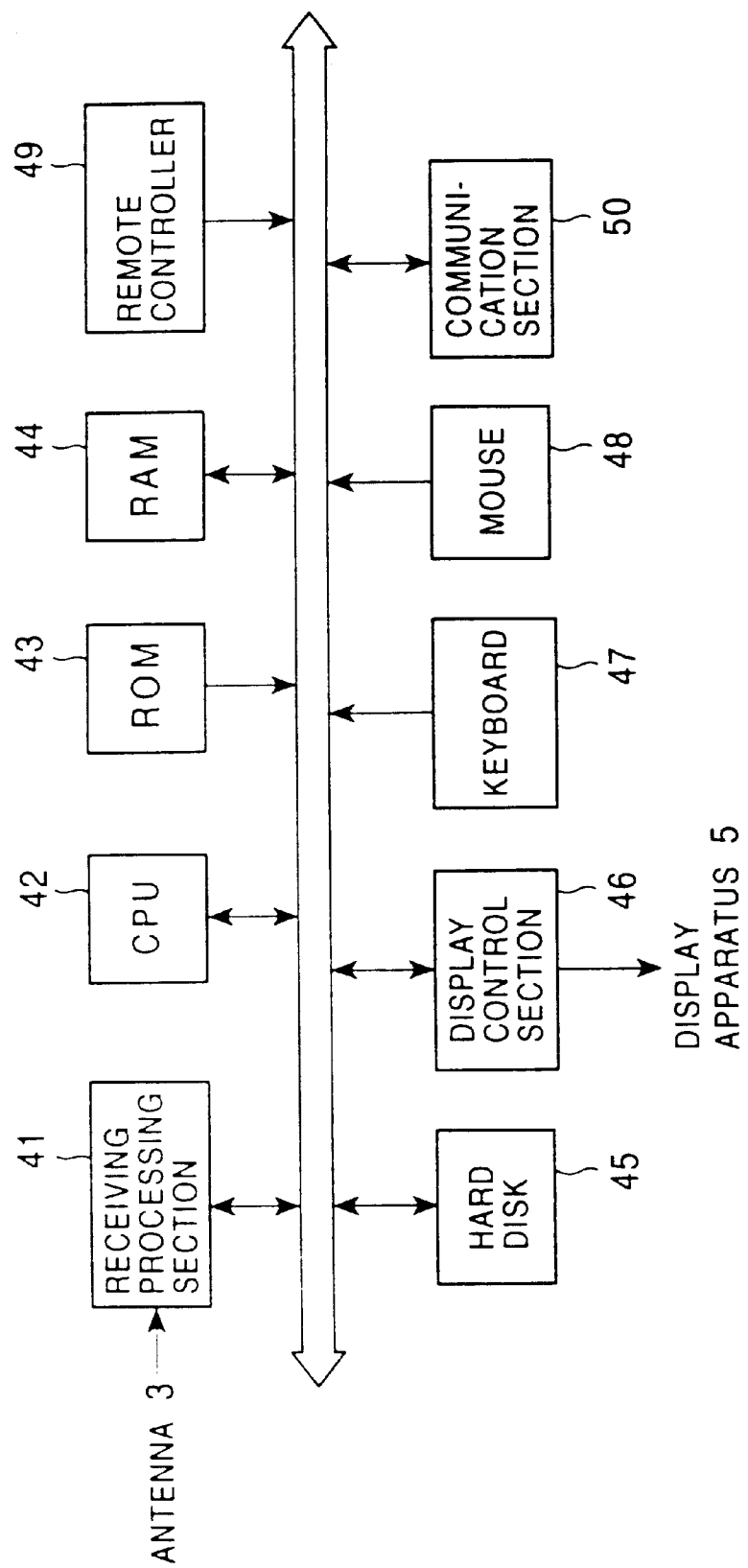
FIG. 6 is a block diagram of IRD 4 of FIG. 1.

FIG. 6 shows the construction of IRD 4 (FIG. 1) for playing back broadcasted video and multimedia information to a viewer. A receiving processing section 41 containing a down converter, a tuner, a demodulator, a descrambler and the like, extracts predetermined channel components (television broadcasting signals and MHEG information signals) from the broadcasted signals received on antenna 3 and supplies these components to CPU 42.

CPU 42 controls IRD 4 through execution of a control program, stored in ROM 43 and RAM 44, and a MHEG information playback program stored on hard disk 45. The broadcasted video and MHEG information are displayed on display apparatus 5 (FIG. 1).

A display control section 46 controls superposing of the MHEG information over the broadcasted video displayed on display apparatus 5. Keyboard 47, mouse 48, and remote controller 49 provide input from a viewer. A communication section 50, for example, a modem, controls information communications over a telephone line, the Internet and the like.

Figure 7:
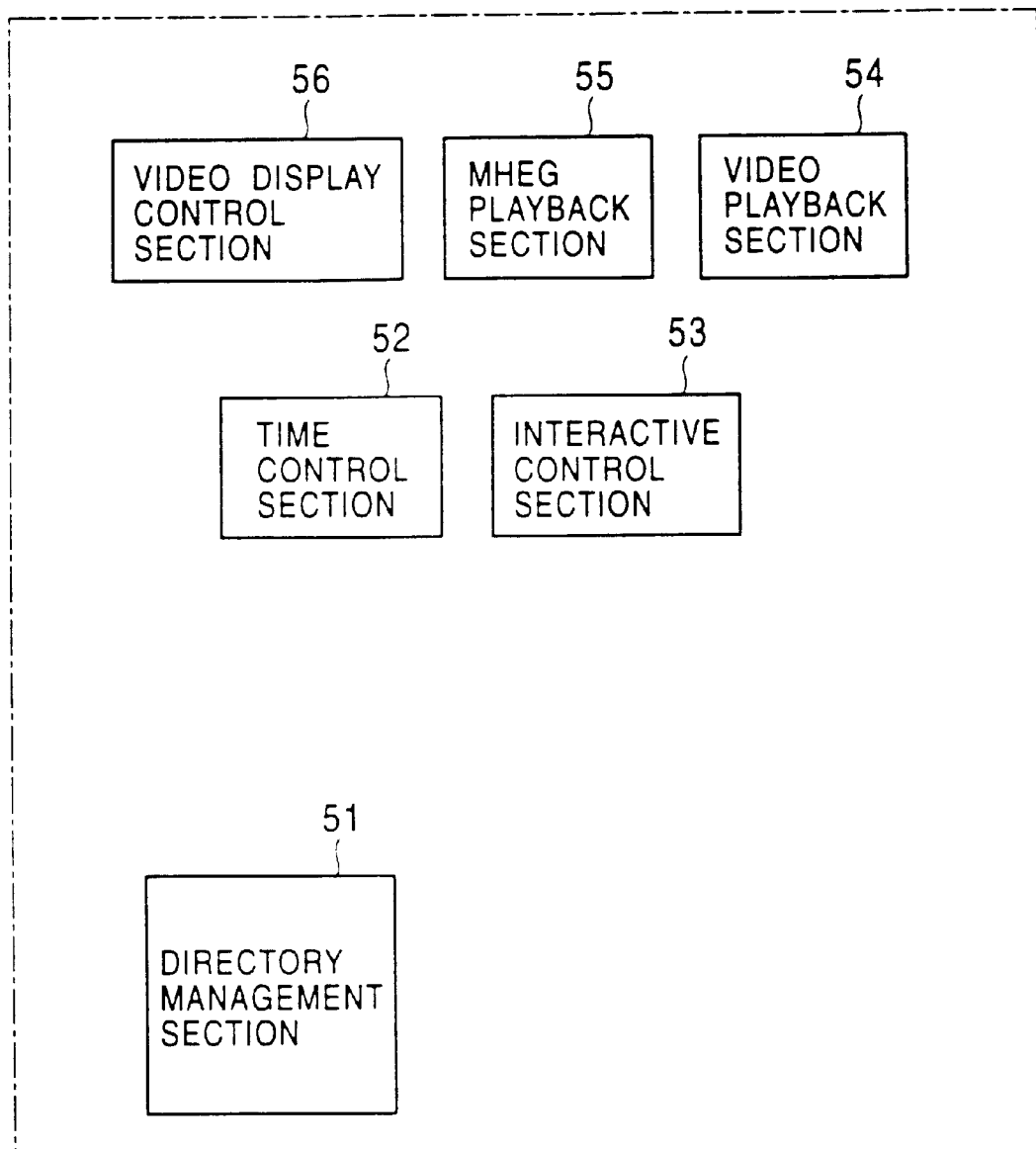
FIG. 7 is a block diagram of the sections of a computer program executed by IRD 4 for playing back multimedia information.

FIG. 7 shows the functional blocks of the MHEG information playback program for IRD 4 stored on hard disk 45 and executed by CPU 42. A video playback section 54 plays back the video of a channel selected by the viewer. A MHEG playback section 55 plays back MHEG information corresponding to this video. A video display control section 56 controls the display apparatus 5 (FIG. 1). This control causes the MHEG information from MHEG playback section 55 to be superposed over the video from video playback section 54.

A directory management section 51 manages the MHEG information's directory and provides this information to the MHEG playback section 55 in accordance with predetermined timing. A timing control section 52 performs time measurement using, as a reference, the time at which the video playback section 54 starts playback of the video corresponding to the MHEG information and informs the MHEG playback section 55 of, for example, the start_time contained in the contents information.

An interactive control section 53 detects operations by a viewer upon the keyboard 47, the mouse 48 or the remote controller 49, and performs predetermined processing pursuant to these operations, such as switching a scene.

Figure 8:
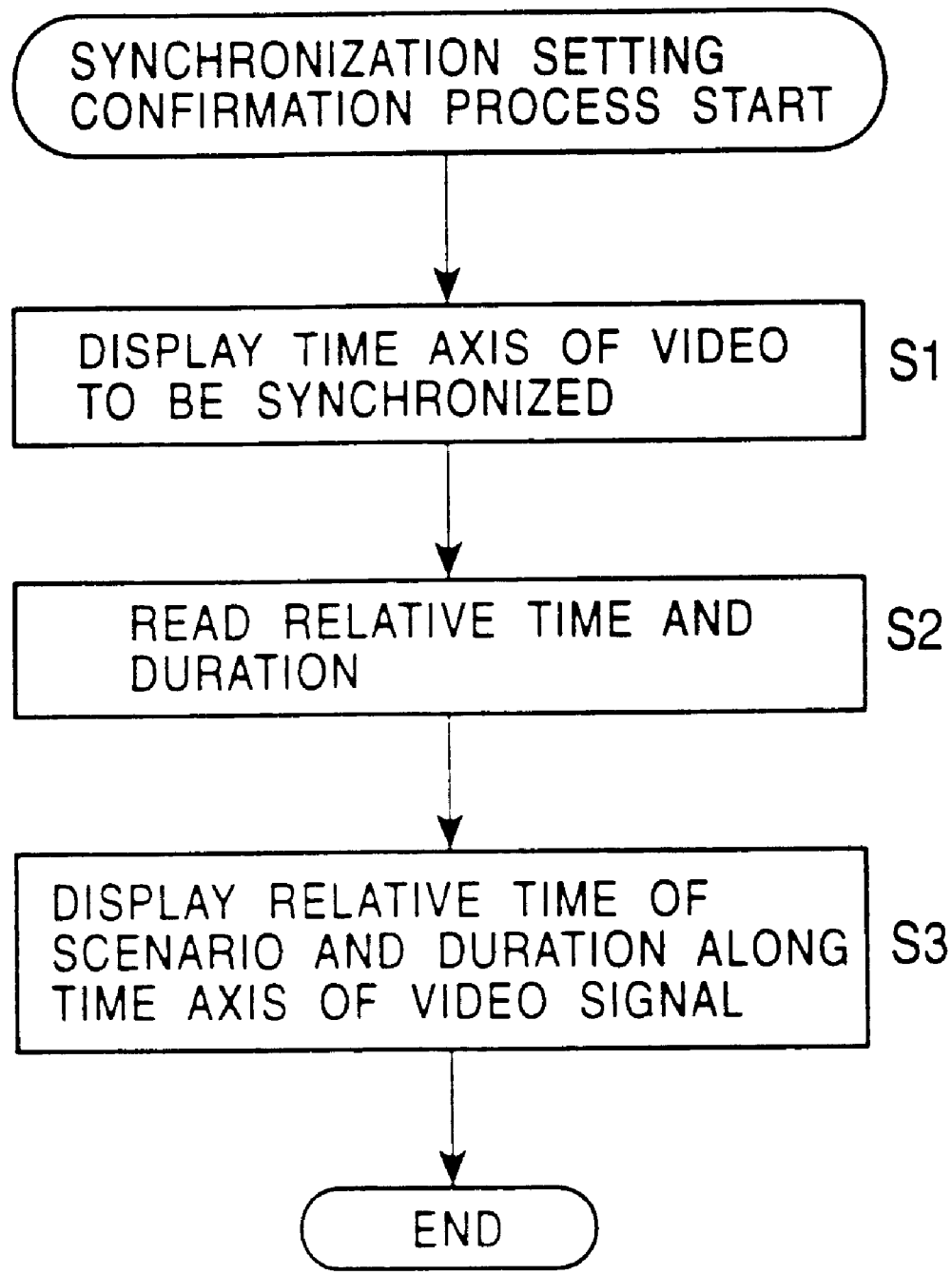
FIG. 8 is a flowchart illustrating the steps for confirming the synchronization settings created by the multimedia creating apparatus of FIG. 2.

Referring again to the apparatus for creating multimedia information shown in FIG. 2, by operating the keyboard 16 (FIG. 2) and setting predetermined values in the contents information (e.g., start_time and duration), a scene can be set to be interactively synchronized with the video defined in program_name. These settings then can be confirmed by CPU 11 in response to an operator's instructions received from keyboard 16 or mouse 17. In response, CPU 11 performs the processing shown in the flowchart of FIG. 8.

As shown in this figure, in step S1, the time control section 27 (FIG. 3) reads the time information (start time and end time) of the video to be played back by video playback section 29. This time information is provided to the video and MHEG display control section 31. As shown in FIG. 9, the video and MHEG display control section 31 causes display apparatus 15 to display a time axis for the video based upon the input time information.

In step S2, the time control section 27 (FIG. 3) reads the playback start time (start_time) and the playback duration (duration) for a scenario to be synchronized with the video. This information also is provided to video and MHEG display control section 31. The operator also provides the sending start time (time that broadcasting begins) and the sending duration (duration of broadcasting) for the MHEG data. This information is recorded in the application information file of the contents creation section 21. The time control section 27 also reads this information and provides it to the video and MHEG display control section 31.

In step S3, the video and MHEG display control section 31 causes display apparatus 15 to display the playback start time, the playback duration, the sending start time and the sending duration along the time axis displayed in step S1. This display, shown in FIG. 9, enables the operator to visualize, and confirm, the synchronization settings for the MHEG information.

Figure 9:
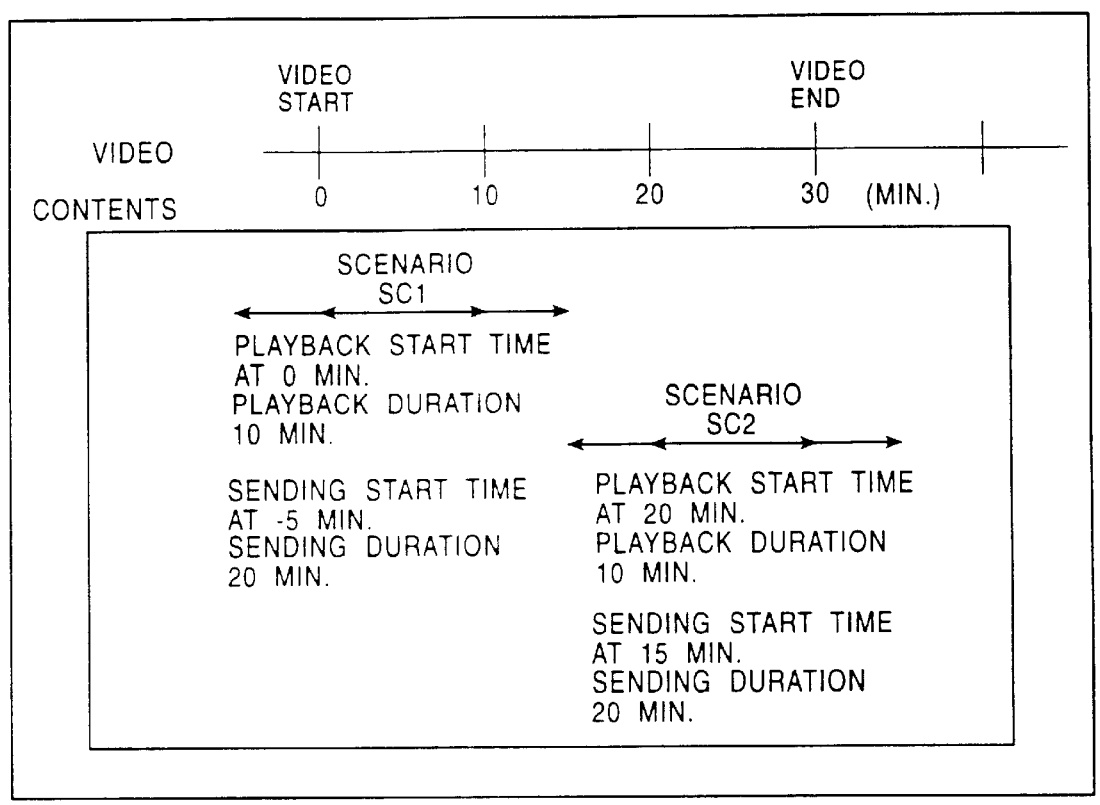
FIG. 9 is an example of a display appearing on display apparatus 15 of the multimedia creating apparatus of FIG. 2 pursuant to steps S1 and S3 of FIG. 8.

In the example shown in FIG. 9, the playback start times, the playback durations, the sending start times and the sending durations for the scenarios SC1 and SC2 are set with respect to the start time for the corresponding video program. For scenario SC1, in this example, the playback start time is set for the same time as the program start time, the playback duration is set for 10 minutes, the sending start time is set for 5 minutes before the program start time and the sending duration is set for 20 minutes. For scenario SC2, the playback start time is set for 20 minutes after the program start time, the playback duration is set for 10 minutes, the sending start time is set for 15 minutes after the program start time, and the sending duration is set for 20 minutes.

During the 5 minute durations after completion of playback of the scenarios, a viewer can, for example, make a telephone call to purchase an item that was displayed (in the case of a shopping program). Since the MHEG creating apparatus enables recording of the settings such that the MHEG information is transmitted only during the necessary times, the transmission channel is used effectively for transmitting a plurality of MHEG data in a time divisional manner.

Figure 10:
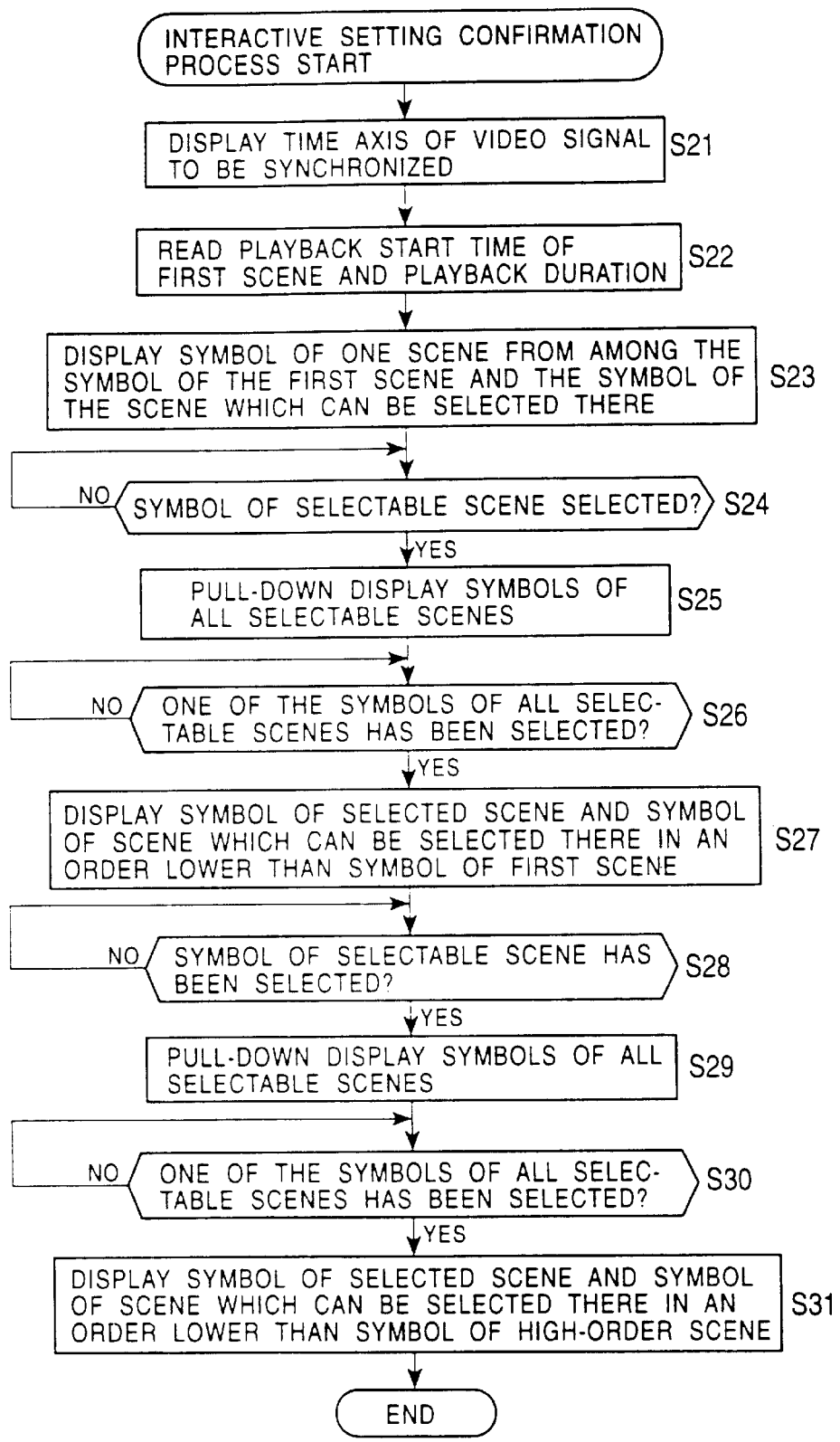
FIG. 10 is a flowchart illustrating the steps for confirming the interactive setting process created by the multimedia creating apparatus of FIG. 2.
Figure 11:
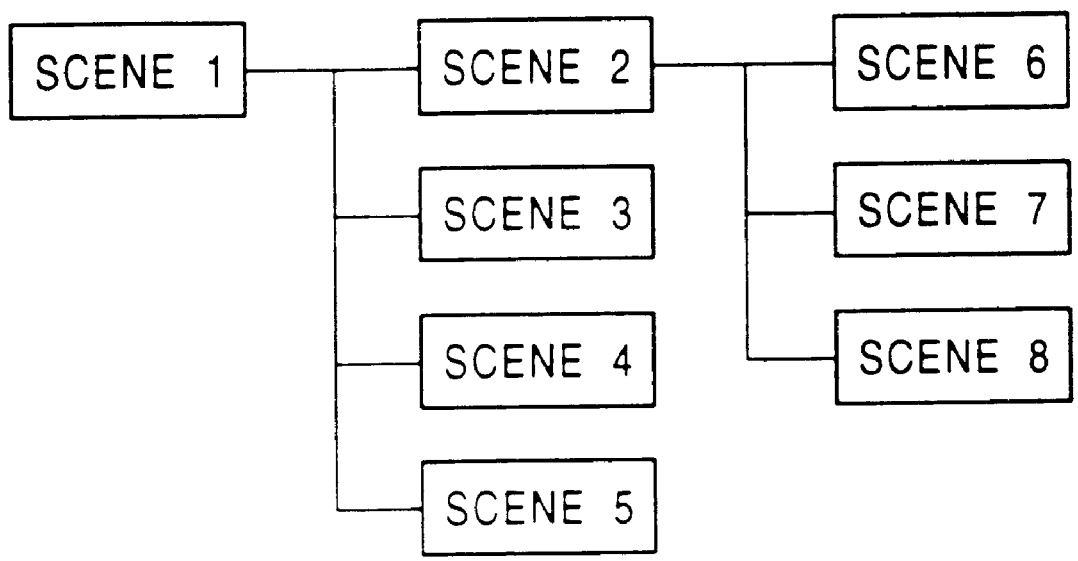
FIG. 11 is an illustration of the link structure of scenes.

The process of confirming the interactive settings for the MHEG information prepared by the creation apparatus of FIG. 2 is described with reference to FIGS. 10, 11 and 12. This process enables the user to visualize, and confirm the accuracy of, the scenes' interactive relationships with respect to time (link relationships) after the synchronization settings, such as playback start time and the like, have been set and the scenes within the scenario have been linked. As an example, as shown in FIG. 11, assume that scenes 2 through 5 are set as possible selections for display by the viewer after scene 1 and that scenes 6 through 8 are set as possible selections for display by the viewer after scene 2.

Upon receipt of an instruction for starting the confirmation process on keyboard 16 or mouse 17 (FIG. 2), the time control section 27 (FIG. 3) reads, in step S21 (FIG. 10), the time information (start time and end time) for the video to be played back by the video playback section 29 (FIG. 3) and supplies this information to the video and MHEG display control section 31 (FIG. 3). As shown in FIG. 12, the video and MHEG display control section 31 causes display apparatus 15 (FIG. 2) to display a time axis for the video based upon the received time information.

In step S22, the time control section 27 next reads the playback start time and the playback duration for the first scene (scene 1) and supplies this information to the video and MHEG display control section 31. In step S23, as shown in FIG. 12, the video and MHEG display control section 31 causes display apparatus 15 to display, below the time axis for the video, a symbol indicating the playback duration for scene 1. This symbol starts 10 minutes after the video start time. The video and MHEG display control section 31 also causes display apparatus 15 to display a symbol for scene 2 adjacent to the symbol for scene 1. The video and MHEG display control section 31 further causes display apparatus 15 to display a triangular mark within the symbol for scene 2 to indicate that other scenes are present (possible other selections for display after scene 1) in the same hierarchy as that for scene 2.

In step S24, the interactive control section 28 determines whether the user has selected the symbol for scene 2 (e.g., clicked by the mouse 17). If this section determines that the symbol for scene 2 has been selected, the process proceeds to step S25.

Figure 12:
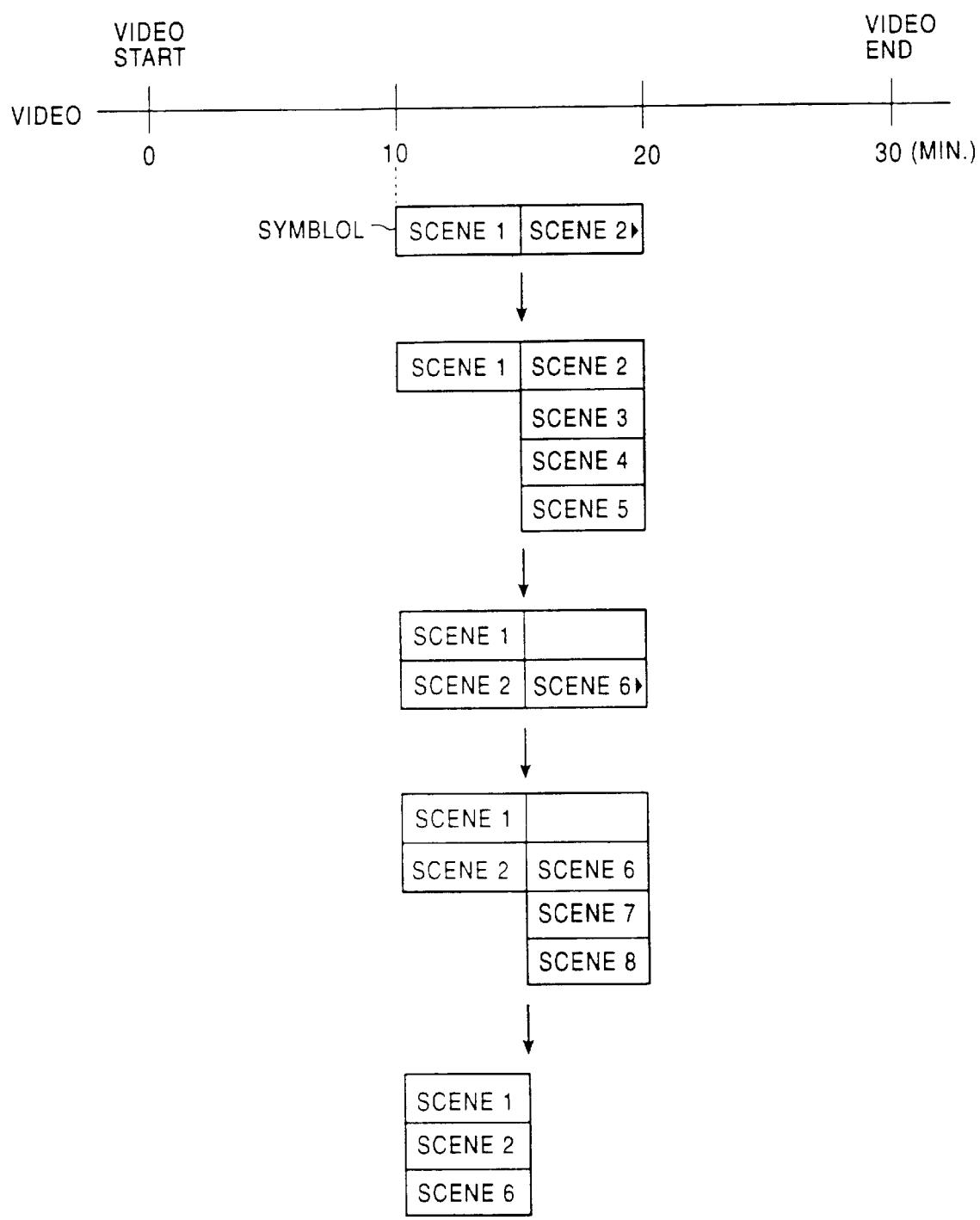
FIG. 12 is an example of a display appearing on display apparatus 15 in accordance with the process of FIG. 10 for confirming interactive settings.

In step S25, the video and MHEG display control section 31 pulls down the symbols for scenes 3 through 5, as shown in FIG. 12, and causes display apparatus 15 to display these symbols below the symbol for scene 2.

In step S26, the interactive control section 28 determines whether the user has selected one of the symbols for scenes 2 through 5. If this section determines that one of these symbols has been selected, the process proceeds to step S27. In this example, it is assumed that the symbol for scene 2 has been selected.

In step S27, as shown in FIG. 12, the video and MHEG display control section 31 causes the display apparatus 15 to display the symbol for scene 2 below the symbol for scene 1 and further display the symbol for scene 6, which is linked to scene 2, in a symbol adjacent to the symbol for scene 2. Within the symbol for scene 6, a triangular mark is displayed to indicate that other scenes are present (possible other selections for display after scene 2) in the same hierarchy as that for scene 6.

In step S28, the interactive control section 28 determines whether the symbol for scene 6 has been selected. If this section determines that the symbol for scene 6 has been selected, the process proceeds to step S29 where the video and MHEG display control section 31 pulls down the symbols for scenes 7 and 8 and displays these symbols below the symbol for scene 6.

In step S30, the interactive control section 28 determines whether one of the symbols for scenes 6 through 8 has been selected. If this section determines that one of these symbols has been selected, the process proceeds to step S31. In this example, it is assumed that the symbol for scene 6 has been selected.

In step S31, the video and MHEG display control section 31 displays the symbol for scene 6 below that for scene 2. Since no scenes are present in a hierarchy below that for scene 6, the processing terminates.

The contents creation section 21 (FIG. 3) also enables a user to set synchronization signals (flags) within the stream of video information. These flags are set in the scene information file by the scene creation section 23 and are processed by IRD 4 (FIG. 1). The setting of a synchronization flag for a scene to the on state causes the scene's switching to be synchronized with the video. The setting of such a flag to the off state disables such synchronization with the video.

Figure 13:
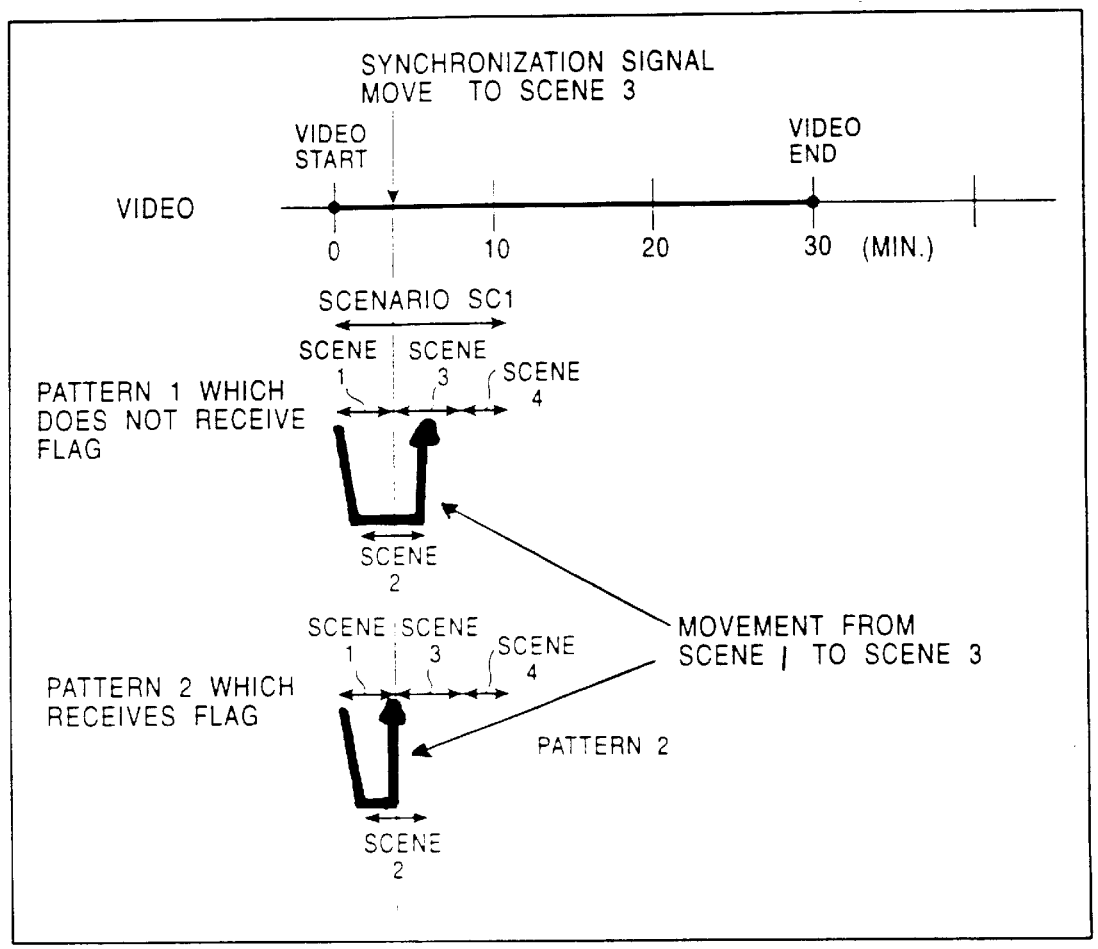
FIG. 13 is an illustration of the effect of the setting of synchronization flags.

For example, as shown in FIG. 13, assume that scenes 1 through 4 form scenario SC1 and a synchronization flag for switching to scene 3 in the middle of scene 2 is received from the video signal. Assume further that in pattern 1, the synchronization flag is off and in pattern 2, the synchronization flag is on. As shown in FIG. 13, in pattern 1 (synchronization flag off), after scene 2 is terminated, scene 3 is played back (the playback is not synchronized with the video). In pattern 2 (synchronization flag on), although playback of scene 2 is incomplete, the scene nevertheless is switched to scene 3 (synchronized playback is performed).

Figure 14:
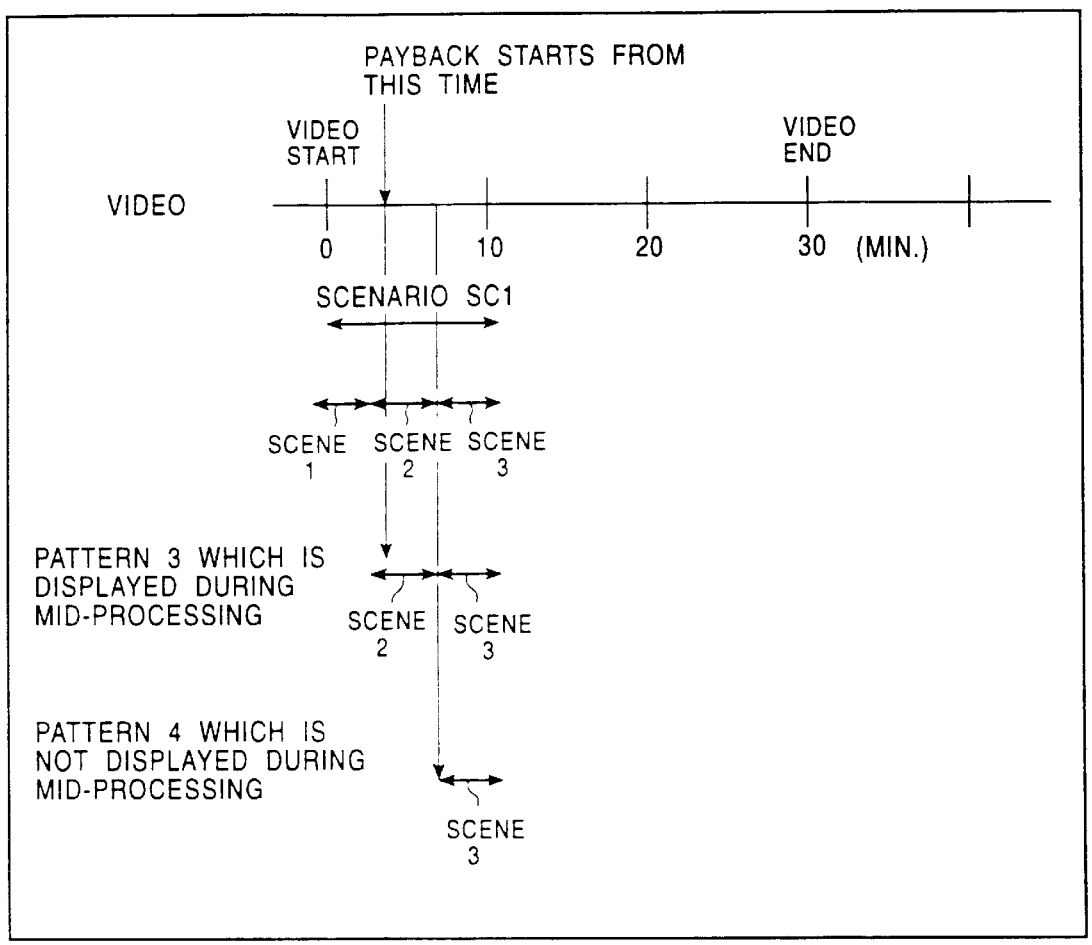
FIG. 14 is an illustration of the effect of the setting of mid-processing display flags.

The scene creation section 23 also may set a mid-processing playback mode flag in the scene information file. For example, as shown in FIG. 14, assume that scenes 1 through 3 form scenario SC1, that these scenes are set to be played back in sequence and that a viewer's playback of the video signals begins during mid-processing of scene 2. Assume further that, in pattern 3, the mid-processing playback mode flag is set to the on state and in pattern 4, the mid-processing playback mode flag is set to the off state. As shown in FIG. 14, in pattern 3, the playback of scene 2 is started during the mid-processing of this scene (since the mid-processing playback mode flag is on, a mid-processing display occurs). In pattern 4, on the other hand, when playback of the video signals begins (for example, IRD 4 is turned on and starts to decode received data), the play back of scene 2 does not begin even if scene data are transmitted (since the mid-processing playback mode flag is off, a mid-processing display does not occur). The first scene played back is scene 3 which begins after termination of the time for playback of scene 2 and at the time set for starting play back of scene 3. This flag prevents the display of multimedia information which is meaningful only if displayed in synchronization with the video.

The scene creation section 23 also can set a display mode flag for transmission to IRD 4 to disable a viewer's ability to turn off multimedia information otherwise selectable by the viewer. For example, this flag may be used if the scene is a commercial synchronized with a commercial video and display of the multimedia information on display apparatus 5 is desired regardless of the viewer's intent. If the display mode flag is set to the on state, the scene is displayed regardless of the viewer's selection on the controls for IRD 4. If the display mode flag is set to the off state, the viewer's selection on the controls for IRD 4 determines whether the MHEG information is displayed.

Figures 15, 16:
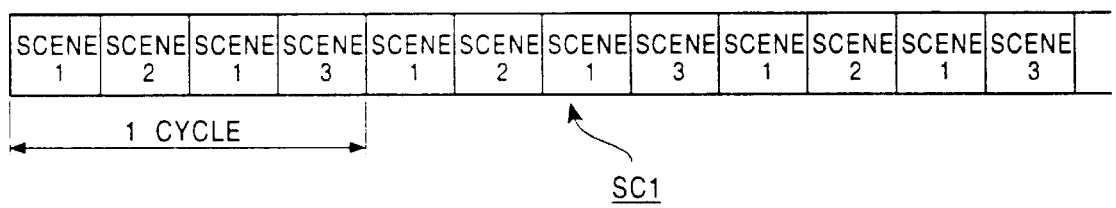
FIG. 15 illustrates a sending rate for scenes.
FIG. 16 further illustrates a sending rate for scenes.

The scene creation section 23 also can set, in the scene priority level for the scene, a number to determine the rate at which the scene is transmitted from broadcasting system 1. For example, as shown in FIG. 15, if scenes 1 through 3 form scenario SC1 and scene 1 (the initial scene) is selected for display most frequently by viewers, the sending rate for scene 1 can be set to, e.g., "2" and the sending rate for scenes 2 and 3 can be set to, e.g., "1". As shown in FIG. 16, in the information stream for scenario SC1 whose transmission rate is set in this manner, the information for scene 1 is sent twice as frequently as that for scenes 2 and 3. This transmission rate decreases the time before the most frequently viewed scene (scene 1) is displayed to the viewer upon selection. Although a ratio of integers is illustrated for the sending rate, this setting could be any ratio.

Although the synchronization settings for the MHEG information with respect to the video are described above as being set using relative time, these synchronization settings also could be set with respect to real or absolute time.

A computer program for performing the above-described methods may be stored on any computer-readable medium, such as an optical disk, magnetic tape or cd-rom, and such a program may be distributed through any means of distribution such as the Internet or digital satellites.

What is claimed is:

1. An information processing apparatus for creating multimedia information to accompany video information transmitted for display to a viewer, the information ocessing apparatus comprising:

creating means for creating the multimedia information;

identifying means for identifying video information with which the multimedia information is to be synchronized;

setting means for setting a timing for displaying one or more scenes of the multimedia information so as to cause the displaying of the one or more scenes to be synchronized with the display of the video information to the viewer; and deactivation means for discriminately deactivating the synchronization of at least one scene of the multimedia information with the display of the video information while allowing synchronization of other scenes of the multimedia information.

2. An information processing apparatus as in claim 1, wherein the multimedia information conforms to a Multimedia and Hypermedia Information Coding Experts Group (MHEG) standard.

3. An information processing apparatus as in claim 1, wherein the multimedia information conforms to an Advanced Television Enhancement Forum (ATVEF) standard.

4. An information processing apparatus as in claim 1, wherein said setting means comprises means for setting the timing with respect to a relative time for the display of the video information.

5. An information processing apparatus as in claim 1, further comprising:

time-axis display means for displaying an axis corresponding to a time for the display of the video information; and display control means for displaying, relative to the axis, symbols corresponding to the timing for displaying the one or more scenes.

6. An information processing apparatus as in claim 1, further comprising mid-processing means for setting a flag to prevent display of a scene of the multimedia information whose playback is synchronized to begin at a point in the video information which occurs before a point at which the viewer begins playing back the video information.

7. An information processing apparatus as in claim 1, further comprising management means for organizing and managing the multimedia information in a hierarchy of contents, scenarios and scenes.

8. An information processing apparatus as in claim 1, further comprising transmission rate setting means for setting a rate at which a plurality of the scenes are transmitted to the viewer.

9. An information processing apparatus as in claim 1, further comprising display disabling means for setting a flag to disable the viewer's ability to prevent the display of the multimedia information.

10. An information processing method for creating multimedia information to accompany video information transmitted for display to a viewer, the information processing method comprising:

creating the multimedia information;

identifying video information with which the multimedia information is to be synchronized;

setting the timing for displaying one or more scenes of the multimedia information so as to cause the displaying of the one or more scenes to be synchronized with the displaying of the video information to the viewer;

setting a flag for the multimedia information for discriminately deactivating the synchronization of at least one scene of the multimedia information with the display of the video information, and setting flags for the multimedia information to allow synchronization of other scenes while the at least one scene is deactivated.

11. An information processing method as in claim 10, wherein the multimedia information conforms to a Multimedia and Hypermedia Information Coding Experts Group (MHEG) standard.

12. An information processing method as in claim 10, wherein the multimedia information conforms to an Advanced Television Enhancement Forum (ATVEF) standard.

13. An information processing method as in claim 10, wherein said setting a timing step includes the step of setting the timing with respect to a relative time for the display of the video information.

14. An information processing method as in claim 10, further comprising the steps of:

displaying an axis corresponding to a time for the display of the video information; and displaying, relative to the axis, symbols corresponding to the timing for displaying the one or more scenes.

15. An information processing method as in claim 10, further comprising the step of setting a flag to prevent display of a scene of the multimedia information whose playback is synchronized to begin at a point in the video information which occurs before a point at which the viewer begins playing back the video information.

16. An information processing method as in claim 10, further comprising the step of organizing and managing the multimedia information in a hierarchy of contents, scenarios, and scenes.

17. An information processing method as in claim 10, further comprising the step of setting a rate at which a plurality of the scenes are transmitted to the viewer.

18. An information processing method as in claim 10, further comprising the step of setting a flag to disable the viewer's ability to prevent the display of the multimedia information.

19. A computer-readable medium having computer-executable instructions stored thereon for creating multimedia information to accompany video information transmitted for display to a viewer, the computer-executable instructions when executed by a computer causing the computer to perform a method comprising the steps of:
   creating the multimedia information;
   identifying video information with which the multimedia information is to be synchronized;
   setting the timing for displaying one or more scenes of the multimedia information so as to cause the displaying of the one or more scenes to be synchronized with the display of the video information to the viewer;
   setting a flag for the multimedia information for discriminately deactivating the synchronization of at least one scene of the multimedia information with the display of the video information; and
   setting flags for the multimedia information to allow synchronization of other scenes while the at least one scene is deactivated.

20. A computer-readable medium as in claim 19, wherein the multimedia information conforms to a Multimedia and Hypermedia Information Coding Experts Group (MHEG) standard.

21. A computer-readable medium as in claim 19, wherein the multimedia information conforms to an Advanced Television Enhancement Forum (ATVEF) standard.

22. A computer-readable medium as in claim 19, wherein the setting a timing step includes the step of setting the timing with respect to a relative time for the display of the video information.

23. A computer-readable medium as in claim 19, wherein the method further comprises the steps of:
   displaying an axis corresponding to a time for the display of the video information; and
   displaying, relative to the axis, symbols corresponding to the timing for displaying the one or more scenes.

24. A computer-readable medium as in claim 19, wherein the method further comprises the step of setting a flag to prevent display of a scene of the multimedia information whose playback is synchronized to begin at a point in the video information which occurs before a point at which the viewer begins playing back the video information.

25. A computer-readable medium as in claim 19, wherein the method further comprises the step of organizing and managing the multimedia information in a hierarchy of contents, scenarios and scenes.

26. A computer-readable medium as in claim 19, wherein the method further comprises the step of setting a rate at which a plurality of the scenes are transmitted to the viewer.

27. A computer-readable medium as in claim 19, wherein the method further comprises the step of setting a flag to disable the viewer's ability to prevent the display of the multimedia information.

28. An apparatus for synchronizing display of a video with multimedia information corresponding to the video, the apparatus comprising:
   means for specifying a duration for displaying the video;
   means for specifying a period for displaying each scene of a plurality of scenes of the multimedia information with respect to the duration for displaying the video;
   means for displaying on a computer screen a plurality of symbols, each of the symbols corresponding to one of the scenes and representing a relative time and position, with respect to the duration for displaying the video, of a period corresponding to the scene; and
   means for setting a flag to prevent display of a scene of the multimedia information whose playback is synchronized to begin, with respect to the video, at a point in the video which occurs before a point at which a viewer begins playing back the video;
   whereby a user is capable of distinguishing which scene and which sequence of scenes to display within the duration of the broadcasting of the video.

29. An apparatus as in claim 28, further comprising means for displaying on the computer screen, concurrently with the symbols, a second symbol representing the duration for displaying the video.

30. An apparatus as in claim 28, wherein the multimedia information conforms to a Multimedia and Hypermedia Information Coding Experts Group (MHEG) standard.

31. An apparatus as in claim 28, wherein the multimedia information conforms to an Advanced Television Enhancement Forum (ATVEF) standard.

32. An apparatus for synchronizing a video with multimedia information for broadcast, the apparatus comprising:
   means for specifying a duration for broadcasting the video;
   means for specifying a period for broadcasting each scene of a plurality of scenes of the multimedia information with respect to the duration for broadcasting the video;
   means for displaying on a computer screen a plurality of symbols, each of the symbols corresponding to one of the scenes and representing a relative time and position, with respect to the duration for broadcasting the video, of a period corresponding to the scene; and
   means for setting a rate at which a plurality of the scenes are transmitted to a viewer;
   whereby a user is capable of distinguishing which scene and which sequence of scenes to display within the duration of the broadcasting of the video.

33. An apparatus as in claim 32, further comprising means for displaying on the computer screen, concurrently with the symbols, a second symbol representing a broadcasting duration of the video.

34. An apparatus as in claim 32, wherein the multimedia information conforms to a Multimedia and Hypermedia Information Coding Experts Group (MHEG) standard.

35. An apparatus as in claim 32, wherein the multimedia information conforms to an Advanced Television Enhancement Forum (ATVEF) standard.

36. A computer-readable medium having computer-executable instructions stored thereon for synchronizing display of a video with multimedia information corresponding to the video, the computer-executable instructions when executed by a computer causing the computer to perform a method comprising the steps of:
   specifying a duration for displaying the video;
   specifying a period for displaying each scene of a plurality of scenes of the multimedia information with respect to the duration for displaying the video;
   displaying on a computer screen a plurality of symbols, each of the symbols corresponding to one of the scenes
   setting a flag to prevent display of a scene of the multimedia information whose playback is synchronized to begin at a point in the video which occurs before a point at which a viewer begins playing back the video;

whereby a user is capable of distinguishing which scene and which sequence of scenes to display within the duration of the broadcasting of the video.

37. A computer-readable medium as in claim 36, wherein the method further comprises the step of displaying on the computer screen, concurrently with the symbols, a second symbol representing the duration for displaying the video.

38. A computer-readable medium as in claim 36, wherein the multimedia information conforms to a Multimedia and Hypermedia Information Coding Experts Group (MHEG) standard.

39. A computer-readable medium as in claim 36, wherein the multimedia information conforms to an Advanced Television Enhancement Forum (ATVEF) standard.

40. A computer-readable medium having computer-executable instructions stored thereon for synchronizing a video with multimedia information for broadcast, the computer-executable instructions when executed by a computer causing the computer to perform a method comprising the steps of:

specifying a duration for broadcasting the video;

specifying a period for broadcasting each scene of a plurality of scenes of the multimedia information with respect to the duration for broadcasting the video;

displaying on the computer screen a plurality of symbols, each of the symbols corresponding to one of the scenes and representing a relative time and position, with respect to the duration for broadcasting the video, of a period corresponding to the scene; and setting a rate at which a plurality of the scenes are transmitted to a viewer;

whereby a user is capable of distinguishing which scene and which sequence of scenes to display within the duration of the broadcasting of the video.

41. A computer-readable medium as in claim 40, wherein the method further comprises the step of displaying on the computer screen, concurrently with the symbols, a second symbol representing a broadcasting duration of the video.

42. A computer-readable medium as in claim 40, wherein the multimedia information conforms to a Multimedia and Hypermedia Information Coding Experts Group (MHEG) standard.

43. A computer-readable medium as in claim 40, wherein the multimedia information conforms to an Advanced Television Enhancement Forum (ATVEF) standard.

* * * * *

UNITED STATES PATENT AND TRADEMARK OFFICE
CERTIFICATE OF CORRECTION

PATENT NO. : 6,751,800 B1
DATED : June 15, 2004
INVENTOR(S) : Kazuhiro Fukuda and Naohisa Kitazato It is certified that error appears in the above-identified patent and that said Letters Patent is hereby corrected as shown below:

Column 9,
Line 9, between "priority" and "level" add "_".
Line 29, "cd-rom" should read -- CD-ROM --.
Line 35, "ocessing" should read -- processing --.

Signed and Sealed this

Third Day of May, 2005

JON W. DUDAS
*Director of the United States Patent and Trademark Office*